US012601413B2

(12) United States Patent
Simon et al.

(10) Patent No.: US 12,601,413 B2
(45) Date of Patent: Apr. 14, 2026

(54) PRESSURE COMPENSATION SYSTEMS, LIQUID SUPPLY SYSTEMS AND METHODS USING THE SAME

(71) Applicant: Watts Regulator Co., North Andover, MA (US)

(72) Inventors: Kevin Simon, Somerville, MA (US); Joseph Michael Burke, Deerfield, NH (US); Ian David Baynes, Merrimac, MA (US)

(73) Assignee: WATTS REGULATOR CO., North Andover, MA (US)

( * ) Notice: Subject to any disclaimer, the term of this patent is extended or adjusted under 35 U.S.C. 154(b) by 968 days.

(21) Appl. No.: 17/173,987

(22) Filed: Feb. 11, 2021

(65) Prior Publication Data

US 2022/0252170 A1 Aug. 11, 2022

(51) Int. Cl.
| | |
|---|---|
| *F16K 17/00* | (2006.01) |
| *E03B 7/07* | (2006.01) |
| *F24F 5/00* | (2006.01) |
| *G01F 15/00* | (2006.01) |

(52) U.S. Cl.
CPC ............ *F16K 17/003* (2013.01); *E03B 7/075* (2013.01); *E03B 7/077* (2013.01); *F24F 5/0003* (2013.01); *G01F 15/005* (2013.01)

(58) Field of Classification Search
CPC ........ E03B 7/077; E03C 1/106; F16K 17/003; F16K 31/02
See application file for complete search history.

(56) References Cited

U.S. PATENT DOCUMENTS

| | | | |
|---|---|---|---|
| 3,561,474 A | 2/1971 | Langley et al. | |
| 5,425,393 A | 6/1995 | Everett | |
| 5,713,240 A * | 2/1998 | Engelmann | F16K 15/035 |
| | | | 73/168 |
| 7,064,671 B2 | 6/2006 | Vanderah et al. | |

(Continued)

FOREIGN PATENT DOCUMENTS

WO 2020023584 1/2020

OTHER PUBLICATIONS

"LFF113FP Wireless Smart Flood Protection Shut Down Valve with SentrPlus Alert Technology", Watts, 2020.

(Continued)

*Primary Examiner* — Reinaldo Sanchez-Medina
(74) *Attorney, Agent, or Firm* — Grossman, Tucker, Perreault & Pfleger, PLLC

(57) ABSTRACT

Fluid detection systems and methods using the same are disclosed. In embodiments the fluid detection systems include a sensor module and an electronics module. The sensor module includes a sensor housing that includes a liquid flow path and a sensor element disposed around at least part of the liquid flow path. The sensor element can detect a capacitance of the liquid flow path and provide a sensor signal to a controller in the electronics module. The electronics module can determine a detected capacitance in the liquid flow path based at least in part on the sensor signal, and can determine whether a wet event has occurred based on a comparison of the detected capacitance to a threshold capacitance. Methods using the fluid detection systems and fluid supply systems including the fluid detection systems are also disclosed.

30 Claims, 7 Drawing Sheets

600

(56) References Cited

U.S. PATENT DOCUMENTS

| | | | |
|---|---|---|---|
| 2001/0016364 A1 | 8/2001 | Loan et al. | |
| 2003/0135334 A1* | 7/2003 | Engelmann | F16K 37/0091 |
| | | | 702/45 |
| 2005/0249631 A1 | 11/2005 | Schulz et al. | |
| 2013/0144202 A1 | 6/2013 | Field et al. | |
| 2015/0354520 A1 | 12/2015 | Bleyer et al. | |
| 2016/0179109 A1 | 6/2016 | Iverson | |
| 2017/0191681 A1 | 7/2017 | Rosca et al. | |
| 2017/0278327 A1 | 9/2017 | Doughty et al. | |
| 2018/0141069 A1* | 5/2018 | Lemkin | G05D 7/0676 |
| 2018/0214802 A1 | 8/2018 | Johnson et al. | |
| 2018/0355589 A1 | 12/2018 | Stoianov et al. | |
| 2019/0086289 A1 | 3/2019 | Shaw, Jr. et al. | |
| 2019/0308485 A1 | 10/2019 | Renault | |
| 2020/0264067 A1* | 8/2020 | Lance | G05D 7/0629 |
| 2020/0347944 A1 | 11/2020 | Lozitsky et al. | |
| 2020/0393324 A1 | 12/2020 | Rudd et al. | |
| 2021/0332898 A1* | 10/2021 | Cellemme | F16K 37/0033 |
| 2022/0259839 A1 | 8/2022 | Pagliaccio et al. | |

OTHER PUBLICATIONS

"Model FCIS (Connected Flood Control System) Reduced Pressure Principle Assembly w/Integral Relief Valve Monitor and Automatic ACV Shutoff", Zurn Wilkins, Mar. 2019.

"Model ZCSM-PF and CSM-BTM Zurn Connected Pressure Monitor (ZCSM-PF) and optional Zurn Connected Flow Meter (ZCSM-BTM)" Zurn Plumbsmart, Aug. 2020.

"Series PVS-7000 Flood Protection Backflow System with SentryPlus Alert", Watts, 2020.

"Watts ACV 113-6RFP Flood Protection Shutdown Valve", Watts, 2000.

International Search Report and Written Opinion from corresponding PCT Appln. No. PCT/US2215992, dated Apr. 28, 2022.

Office Action from corresponding U.S. Appl. No. 17/674,381 dated Mar. 9, 2023. 16 pages.

International Preliminary Report on Patentability and Written Opinion from corresponding PCT Appln. No. PCT/US22/15992, dated Aug. 15, 2023.

* cited by examiner

200

300

To
Outlet

Controller
309

Sensor
307

From
Supply

Inlet Gate
101

ACV
305

Valve
System
303

Outlet Gate
107

T

P1          P2 = T + D          P3 = T

Pressure -

Flow -

$P_{outlet}$

% ACV Open

Flow

700

PRESSURE COMPENSATION SYSTEMS, LIQUID SUPPLY SYSTEMS AND METHODS USING THE SAME

TECHNICAL FIELD

The present disclosure relates to pressure compensation systems, liquid supply systems and methods using the same. In particular, the present disclosure relates to pressure compensation systems that are suitable for use in a water supply system comprising a backflow preventer downstream of an automatic control valve.

BACKGROUND

Fluid supply systems often convey fluid from a pressurized source to a destination, such as a building or other structure. For example, buildings often include a water supply system that is configured to receive a pressurized supply of water from a municipal water system, and to convey water to various outlets such as toilets, faucets, fire prevention systems, etc., within the building. When the water is provided at a sufficient pressure it will be pressurized against and can flow through the outlets in a forward direction. If pressure is lost or reduced below a threshold amount, however, a "backflow" condition may arise in which the water flows backwards toward the source. As fluid backflow may contaminate the source, technologies such as backflow preventers have been implemented to limit or prevent fluid backflow.

FIG. 1A depicts one example of a fluid supply system that includes a backflow preventer upstream of an automatic control valve (ACV). System 100 includes a backflow preventer 103 that has an inlet fluidly coupled to a source of fluid (e.g., a municipal water supply) and an outlet that is fluidly coupled to an inlet of ACV 105. The outlet of ACV 105 is fluidly coupled to one or more outlets, such outlets within a building. System 100 may also optionally include an inlet gate valve 101 and an outlet gate valve 107. The inlet gate valve 101 and outlet gate valve 107 may be opened to permit fluid flow or closed to permit testing of backflow preventer 103 and/or ACV 105.

During normal operation of system 100, fluid (e.g., water) may be supplied to the inlet of the backflow preventer at a first (e.g., supply) fluid pressure P1. After passing through the backflow preventer (i.e., at the outlet of backflow preventer 103) the fluid has a second fluid pressure P2 that is less than P1 due to pressure drop across backflow preventer 103. That is, $P2=P1-D$, wherein D is the pressure drop across backflow preventer 103. The fluid is then supplied to the inlet of ACV 105 at pressure P2. ACV 105 is generally configured to supply fluid at a target pressure P3 to downstream outlets, e.g. within a building. To accomplish that ACV 105 includes a valve that can be repositioned to achieve a fluid pressure P3 downstream of ACV 105, where the P3 is equal to a target outlet fluid pressure T of the system. That concept is illustrated in FIG. 1B, which is a plot flow versus pressure (P3) at or downstream of the outlet of ACV 105 and the degree to which the valve within ACV 105 is open (in percent). As shown, P3 can be controlled by adjusting the degree to which the valve in ACV 105 is open with a corresponding impact on liquid flow.

Although useful the system in FIG. 1A is not without drawbacks. For example, because backflow preventer 103 is upstream of ACV 105, the inlet of backflow preventer 103 is exposed to the inlet fluid pressure P1 provided by the supply. When P1 is within an acceptable pressure tolerance for backflow preventer 103 such a configuration is useable. However, backflow preventer 103 may still experience accelerated wear and tear over time—particularly if P1 is relatively high. And when P1 is higher than acceptable pressure tolerances for backflow preventer 103, steps may need to be taken to reduce the pressure at the inlet of backflow preventer 103, e.g., to reduce the risk of damage to backflow preventer 103 and/or to prevent a pressure relief valve within backflow preventer 103 from opening and potentially discharging more fluid than the content of the building's plumbing system.

Backflow prevention systems with an ACV upstream of a backflow preventer have also been developed. FIG. 2A depicts one example of such a system. System 200 includes an ACV 105 with an inlet that is fluidly coupled to a supply of fluid (e.g. a municipal water supply), and an outlet that is fluidly coupled to an inlet of a backflow preventer 103. The backflow preventer 103 includes an outlet that is fluidly coupled to one or more outlets, e.g., within a building. Like system 100, system 200 may optionally include an inlet gate valve 101 and an outlet gate valve 107, which in this case are fluidly coupled upstream of ACV 105 and downstream of backflow preventer 103, respectively.

During normal operation of system 200, fluid is supplied at to the inlet of ACV 105 at an inlet fluid pressure P1. In this configuration ACV 105 is configured to supply the fluid at a second pressure P2 to backflow preventer 103. The second pressure P2 is generally set by adjusting the position of the actuatable valve within ACV 105. Often P2<P1, in which case ACV 105 functions as a pressure reducer. In any case, P2 may be set based on a target fluid pressure T for system 200. For example, fluid may be supplied to the inlet of ACV 105 at an inlet fluid pressure P1 of 150 pounds per square inch (PSI), and the target pressure T for supply to a building (i.e., the pressure downstream of backflow preventer 103) may be 50 PSI. In such instances, the position of the actuatable valve within ACV 105 may be set such that the P2=T (i.e., 50 PSI). Due to pressure drop across backflow preventer 103, however, the fluid downstream of backflow preventer 103 will have a third fluid pressure P3 that is less than P2 and, thus, less than T. That is, $P3=P2-D$, where D is the pressure drop across backflow preventer 103. The impact of the pressure drop across backflow preventer 103 will be carried through to the downstream outlets. That is, in system 100 the fluid will not be provided to the downstream outlets at the target fluid pressure T, but rather at a pressure of T-D. This concept is shown in in FIG. 2B, which is a plot of outlet pressure (in this case, P3) and % ACV open versus flow for a system configured in the manner shown in FIG. 2A. Consequently, additional booster pump capacity or other equipment may be needed to raise the pressure downstream of the backflow preventer to increase P3 to T—imposing additional complexity and cost on the system.

A need therefore remains in the art for improved technologies for providing fluid at a desired target pressure to one or more outlets downstream of a backflow preventer that is fluidly coupled downstream of an ACV.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figures 1A, 1B:
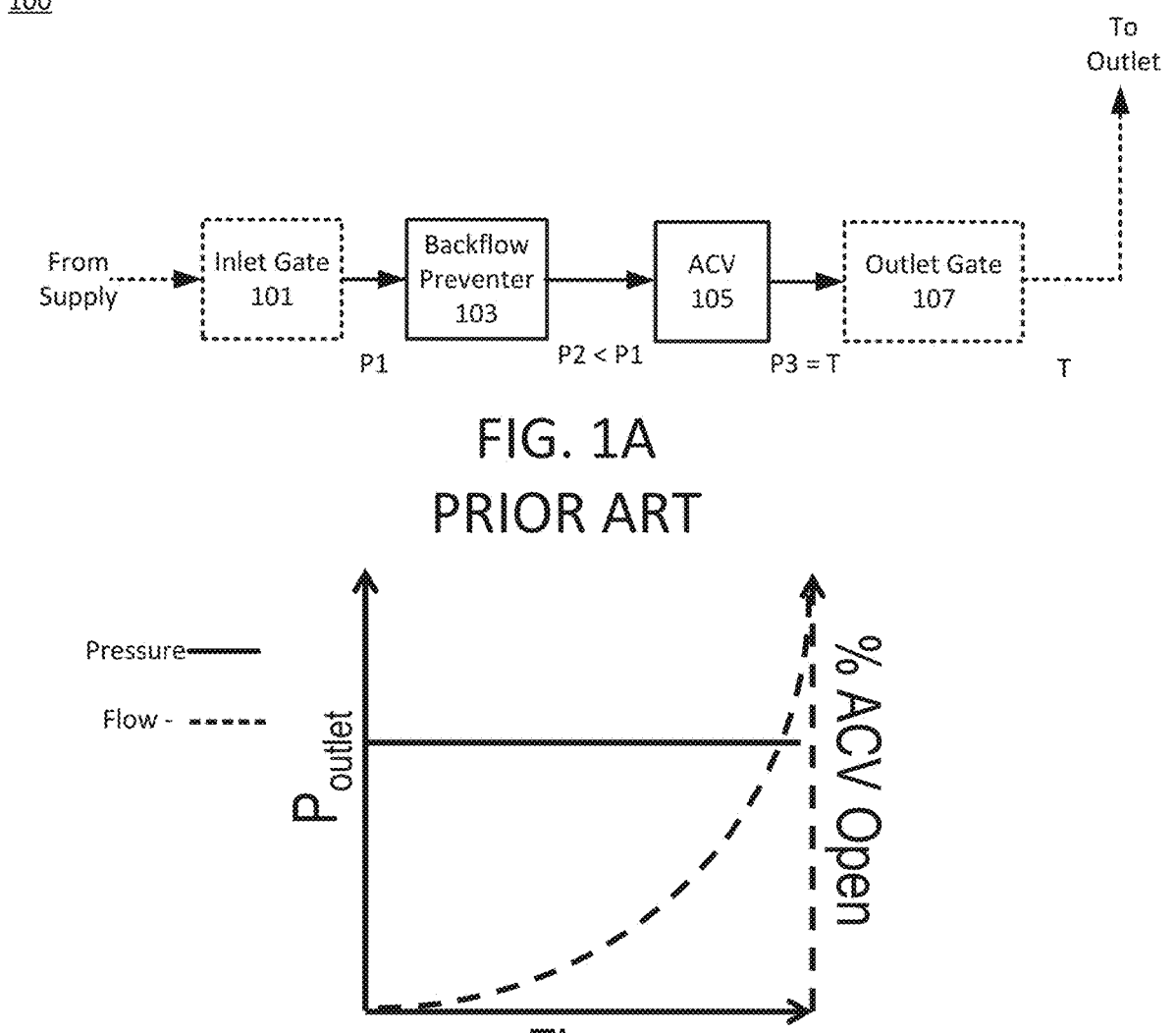
FIG. 1A is a schematic drawing of a prior art fluid supply system including a backflow preventer upstream of an automatic control valve (ACV)
FIG. 1B is a plot of pressure at the outlet of ACV 105 and the degree to which ACV 105 is open versus flow, for system 100 in FIG. 1A.
Figure 2A:
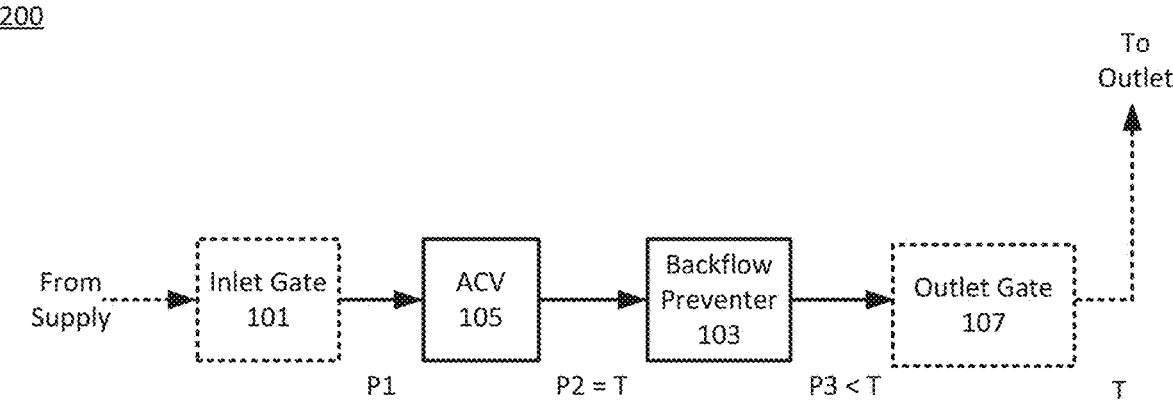
FIG. 2A is a schematic drawing of a prior art fluid supply system including a backflow preventer downstream of an ACV.
Figure 2B:
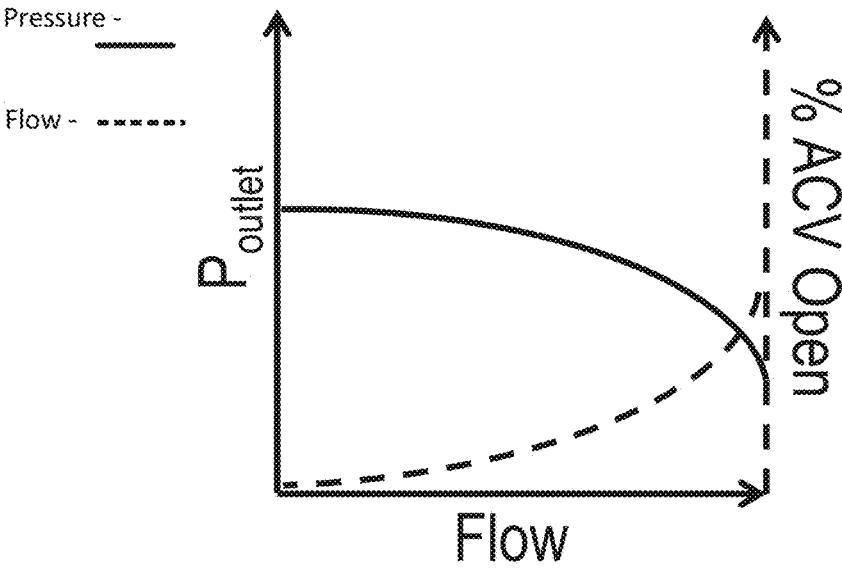
FIG. 2B is a plot of pressure at the outlet of backflow preventer 103 and the degree to which ACV 105 is open versus flow, for system 200 in FIG. 2A.

Although the following Detailed Description will proceed with reference being made to illustrative embodiments, many alternatives, modifications and variations thereof will be apparent to those skilled in the art.

DETAILED DESCRIPTION

As noted in the background water and other fluid supply systems often include a backflow preventer to prevent fluid backflow towards a source. An automatic control valve (ACV) may be fluidly coupled downstream or upstream of the backflow preventer. In the downstream configuration the ACV valve can function to provide fluid with a desired target inlet pressure to one or more downstream outlets. In that configuration, however, the backflow preventer is exposed to the pressure provided by a fluid supply (e.g., a municipal water supply), potentially resulting in accelerated wear and or damage to the backflow preventer. In the upstream configuration the backflow preventer is insulated from the supply pressure by the ACV. Because the ACV does not compensate for pressure drop that occurs across the backflow preventer, however, the fluid pressure at the outlet of the backflow preventer may be less than the target fluid pressure for a destination downstream of the backflow preventer.

The present disclosure relates to pressure compensation systems, liquid supply systems using the same, and pressure compensation methods using the same. In particular, the present disclosure relates to pressure compensation systems that are suitable for use in a water supply system comprising a backflow preventer or other valve system downstream of an automatic control valve In embodiments the pressure compensation systems described herein are suitable for use with a water or other fluid supply system, such as a municipal water supply. The pressure compensation systems may include a first pressure sensor that is configured to detect a fluid pressure P3 corresponding to an outlet fluid pressure of a valve system fluidly coupled downstream of an automatic control valve (ACV). The systems may further include a controller that is configured to communicatively couple to the first pressure sensor and to an actuator that is configured to control a position of a valve within the ACV. The controller may be configured to determine P3 based at least in part on the first sensor signal and to compare P3 to a target fluid pressure T of the fluid/water supply system. When P3 differs from T, the controller is configured to produce and send a control signal to the actuator, wherein the control signal is configured to cause the actuator to change the position of the valve within the ACV, e.g., such that P3 at least substantially equals T.

In embodiments the valve system is a backflow preventer that includes one or more check valve assemblies. In such instances the first pressure sensor is configured to detect P3 within or downstream of the backflow preventer. When the backflow preventer includes a first check valve assembly and a second check valve assembly, the first pressure sensor may be configured to detect P3 within or downstream of the second check valve assembly. In such instances the second check valve assembly may be located downstream of the first check valve assembly.

In further embodiments the pressure compensation system includes a second pressure sensor that is configured to detect an inlet fluid pressure P1 corresponding to a fluid pressure provided to an inlet of the ACV, and to produce a second sensor signal indicative of P1. In such instances the controller is configured to communicatively coupled to the second pressure sensor and to determine P1 based at least in part on the second sensor signal. And when P3 differs from T, the controller is configured to produce the control signal based at least in part on the first sensor signal and the second sensor signal.

In embodiments the controller is configured to determine a pressure drop D across the valve system based at least in part on a comparison of P3 and T. In such instances when P3 differs from T, the control signal is configured to cause the actuator to change the position of the valve within the ACV such that a fluid pressure P2 between the ACV and the valve system (i.e., upstream of the valve system but downstream of the ACV) at least substantially equals P3+D. In embodiments the pressure compensation systems may include a third pressure sensor that is configured to detect P2 and produce a third sensor signal that is indicative of P2. In such embodiments the controller may be configured to determine whether P2 at least substantially equals P3+D based at least in part on the third sensor signal. If P2 does not substantially equal P3+D, the controller may adjust the control signal to cause P2 to at least substantially equal P3+D.

In still further embodiments, the pressure compensation systems include a second pressure sensor that is configured to detect an inlet fluid pressure P1 that corresponds to a fluid pressure provided to an inlet of the ACV, and to produce a second sensor signal that is indicative of P1. In such embodiments the controller may be configured to communicatively couple to the second pressure sensor and to determine P1 based at least in part on the second sensor signal. And when P3 differs from T, the controller may be configured to produce the control signal based at least in part on the first sensor signal and the second sensor signal.

Pressure compensated water supply systems are also disclosed herein. In embodiments such systems include an automatic control valve (ACV), a valve system, a first pressure sensor, a controller, and an actuator. The ACV includes an inlet and an outlet, wherein the inlet is fluidly coupled to a water supply. The valve system has an inlet fluidly coupled to the outlet of the ACV and an outlet fluidly coupled to at least one outlet in a destination. The first pressure sensor is configured to detect a fluid pressure (P3) corresponding to an outlet fluid pressure the valve system, and to produce a first sensor signal indicative of P3. The controller is configured to communicatively couple to the first pressure sensor. The actuator for the ACV is configured to communicatively couple to the controller and to control a position of a valve within the ACV. The controller is further configured to determine P3 based at least in part on the first sensor signal and to compare P3 to a target outlet pressure T of said water supply system. When P3 differs from T, the controller is configured to produce and send a control signal to the actuator, wherein the control signal is configured to cause the actuator to change the position of the valve within the ACV. In embodiments the control signal is configured to cause the actuator to change the position of the valve within the ACV such that P3 at least substantially equals T.

The valve system may be any suitable valve system, such as but not limited to a backflow preventer. In embodiments, the valve system is a backflow preventer that includes a first check valve assembly and a second check valve assembly, and the first pressure sensor is configured to detect P3 within or downstream of the second check valve assembly. In some instances the system may further include a second pressure sensor configured to detect an inlet pressure P1 corresponding to a fluid pressure provided to the inlet of the ACV, and to produce a second sensor signal indicative of P1. In such embodiments the controller is configured to communicatively couple to the second pressure sensor and to determine P1 based at least in part on the second sensor signal. When P3 differs from T, the controller is further configured to produce the control signal based at least in part on the first sensor signal and the second sensor signal.

In some embodiments the controller is further configured to determine a pressure drop D across the valve system based at least in part on the comparison of P3 and T. In such embodiments, when P3 differs from T the controller configures the control signal to cause the actuator to change the position of the valve within the ACV such that a fluid pressure P2 between the ACV and the valve system at least substantially equals P3+D. In such embodiments the system can further include a third pressure sensor that is configured to detect P2 and to produce a third sensor signal indicative of P2, and the controller may be configured to confirm that P2 at least substantially equals P3+D based at least in part on the third sensor signal.

In some embodiments the systems described herein include a second pressure that is configured to detect an inlet pressure P1 corresponding to a fluid pressure provided to an inlet of the ACV, and to produce a second sensor signal indicative of P1. In such instances the controller may be configured to communicatively couple to the second pressure sensor and to determine P1 based at least in part on the second sensor signal. When P3 differs from T in such embodiments, the controller may configure the control signal based at least in part on the first sensor signal (indicative of P3) and the second sensor signal (indicative of P1). In such embodiments, the valve system may be a backflow preventer such as a backflow preventer with a double check valve assembly.

Methods of pressure compensation for a water supply system that includes an automatic control valve (ACV) comprising an inlet fluidly coupled to a water supply and an outlet fluidly coupled to a valve system are also described.

Such methods include, with a first pressure sensor, detecting a fluid pressure P3 corresponding to an outlet fluid pressure of the valve system and producing a first sensor signal indicative of P3. The methods may further include, with a controller communicatively coupled to the first pressure sensor and communicatively coupled to an actuator for a valve within the ACV: determining P3 based at least in part on the first sensor signal; comparing P3 to a target outlet fluid pressure T of said water supply system; and when P3 differs from T, producing and sending a control signal to said actuator, the control signal configured to cause the actuator to change the position of the valve within the ACV. In embodiments the control signal is configured to cause the actuator to change the position of the valve within the ACV such that P3 at least substantially equals T.

The methods may be utilized with systems in which the valve system is a backflow preventer. In embodiments, the methods are used with a system that includes a valve system that includes a backflow preventer with a first check assembly and a second check assembly. In such embodiments detecting P3 with the first pressure sensor includes detecting P3 within or downstream of the second check valve assembly.

In some embodiments the methods further include, with a second pressure sensor communicatively coupled to the controller, detecting an inlet fluid pressure P1 corresponding to a fluid pressure provided to an inlet of the ACV, and generating a second sensor signal indicative of P1. In such instances the method may further include, with the controller: determining P1 based at least in part on the second sensor signal; and when P3 differs from T, producing said control signal based at least in part on the first sensor signal and the second sensor signal.

In embodiments the methods described herein further include, with the controller: determining a pressure drop D across the valve system based at least in part on the comparison of P3 and T; and when P3 differs from T, configuring the control signal to cause the actuator to change the position of the valve within the ACV such that a fluid pressure P2 between the ACV and the valve system at least substantially equals P3+D. In such instances the method may further include, with a third pressure sensor communicatively coupled to the controller, detecting P2 and producing a third sensor signal indicative of P2; and with the controller, determining whether P2 at least substantially equals P3+D based at least in part on the third sensor signal. Alternatively or additionally, the method may further include, with a second pressure sensor communicatively coupled to the controller, determining an inlet fluid pressure P1 corresponding to a fluid pressure provided to an inlet of the ACV and producing a second sensor signal indicative of P1; and with the controller: determining P1 based at least in part on the second sensor signal; and when P3 differs from T, producing the control signal based at least in part on the first sensor signal and the second sensor signal.

For the sake of clarity and ease of understanding the pressure compensation systems of the present disclosure are described herein in the context of a pressure compensated liquid (e.g., water) supply system. It should be understood however that the components of the pressure compensation systems described herein may be provided separately from a liquid supply system, and thus the components of the liquid supply system are not required.

Figures 3A, 3B:
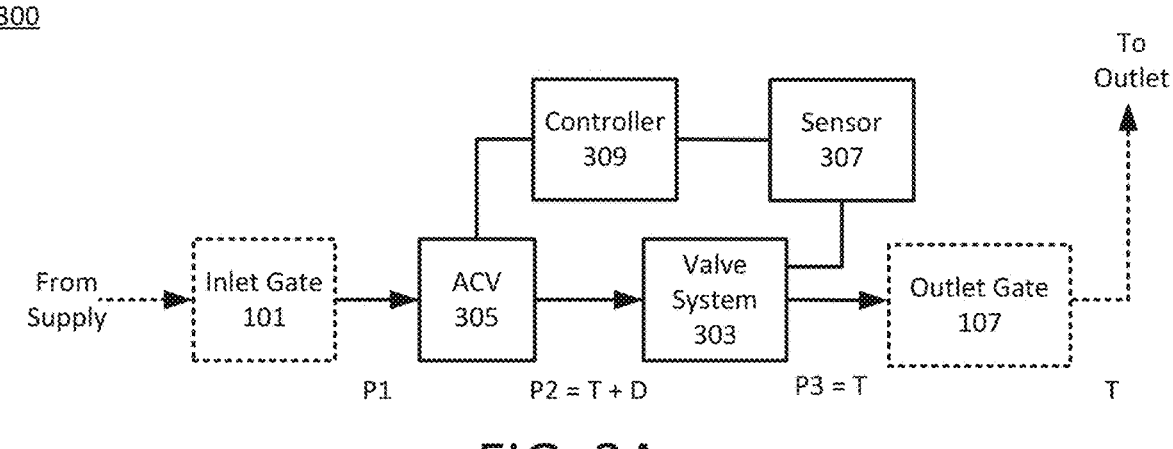
FIG. 3A is a schematic drawing of one example of a pressure compensated fluid supply system including a backflow preventer downstream of an ACV, consistent with the present disclosure.
FIG. 3B is a plot of is a plot of pressure at the outlet of backflow preventer 103 and the degree to which ACV 105 is open versus flow, for the pressure compensated fluid supply system of FIG. 3A.

FIG. 3A illustrates one example of a pressure compensated fluid supply system consistent with the present disclosure. System 300 includes valve system 303, automatic control valve (ACV) 305, first pressure sensor 307 (also referred to herein as sensor 307), and controller 309. ACV 305 includes an inlet that is fluidly coupled to a fluid supply, such as a municipal water supply. ACV further includes an outlet that is fluidly coupled to an inlet of valve system 303. The outlet of valve system 303 is fluidly coupled to one or more downstream outlets, such as outlets within a building or another destination for system 300. System 300 may optionally include an inlet gate valve 101 between ACV 105 and the supply, and an outlet gate valve 107 between valve system 303 and the outlets within the destination for system 300. When used, inlet and outlet gate valves 101, 107 may have an open state that permits fluid flow through system 300, and a closed state in which fluid flow through system 300 is prevented.

Valve system 303 may be any suitable plumbing component that includes at least one valve. In embodiments, valve system 303 is or includes a backflow preventer that includes one or a plurality (i.e., 2 or more) check valve assemblies. In embodiments valve system 303 is or includes a backflow preventer that includes a plurality (i.e., two or more) check valve assemblies that are arranged in series or in parallel. For example, in specific non-limiting embodiments valve system 303 is or includes a backflow preventer including at least a first check valve assembly and a second check valve assembly, wherein the second check valve assembly is fluidly coupled downstream of the first check valve assembly. For example, valve system 303 may be a single or multiple check valve backflow preventer. Non-limiting examples of suitable plumbing components that may be used as valve system 303 include those produced and sold by WATTS Water Technologies, Inc., such as but not limited to the WATTS 957 RPZ backflow preventer, the WATTS series LF909 reduced pressure zone assembly, the Watts 909 series backflow preventers, combinations thereof, and the like. Without limitation, valve system 303 is preferably a backflow preventer that includes at least first and second check valve assemblies that are arranged in series, with the second check valve assembly located downstream of the first check valve assembly. Such systems are described later in connection with FIGS. 4 and 6.

ACV 305 may be any suitable valve that may be electronically or mechanically controlled. Non-limiting example of valves that can be used as ACV 305 include the LF113 series of valves sold by WATTS®, such as the LF113FP valve. In any case ACV 305 includes at least one valve, wherein a set point of the valve may be adjusted by an actuator (or "pilot," not shown). Any suitable type of actuator may be used to adjust the position of the valve within ACV 305. Non-limiting examples of suitable actuators include solenoids, a pressure regulating valve, motorized ball valves, combinations thereof, and the like. Without limitation, in embodiments system 300 utilizes one or more solenoids (e.g., a proportional solenoid) to control the position of the valve within ACV 305. In those or other embodiments, the actuator may be capable of incrementally moving the valve within ACV 305 between a fully closed position and a fully closed position, e.g., in response to a control signal.

The position of the valve within ACV 305 may be set to achieve a fluid pressure P2, wherein P2 corresponds to a fluid pressure between ACV 305 and valve system 303. In non-limiting embodiments, the position of the valve in ACV 305 may be set such that P2 is at least substantially equal to T+D, wherein T is the target outlet fluid pressure of system 300, and D is the pressure drop across valve system 303. As can be seen in FIG. 3B, the position of the valve in ACV 305 can also be set to achieve a desired outlet pressure (i.e., P3), with a corresponding impact on fluid flow.

Sensor 307 may be any suitable sensor that is capable of detecting fluid pressure within a plumbing system. Non-limiting examples of suitable pressure sensors include mechanical pressure sensors, digital pressure sensors (e.g., with an analog or a digital output), microelectromechanical machine (MEMS) pressure sensors, piezoelectric pressure sensors, combinations thereof, and the like. Without limitation, sensor 307 is preferably a digital pressure sensor.

In general, sensor 307 is configured to detect a fluid pressure P3, wherein P3 is a gauge pressure corresponding to the outlet fluid pressure of valve system 303. In embodiments, sensor 307 is configured to detect P3 within valve system 303, at an outlet of valve system 303, and/or downstream of an outlet of P3. Regardless of where it is measured, P3 corresponds to the outlet pressure of the fluid after it passes through valve system 303.

Sensor 307 is further configured to produce a first sensor signal that is indicative of P3, and to provide the first sensor signal to controller 309. The first sensor signal may be a mechanical (e.g., pneumatic, hydraulic, etc.) signal, a digital signal, or an analog signal. Preferably the first sensor signal is a digital signal. In that regard sensor 307 may be configured to communicatively couple to controller 309 in any suitable manner, such as via a wired or wireless communication protocol. In embodiments sensor 307 is communicatively coupled to controller 309 via a wire, such that the first sensor signal can be communicated from sensor 307 to controller 309 via a wired communications protocol. In other embodiments sensor 307 is communicatively coupled to controller 309 via a wireless communications protocol (e.g., WLAN, Wi-Fi, BLUETOOTH, ZIGBEE, near field communication, combinations thereof and the like), in which case the first sensor signal may be wirelessly communicated from sensor 307 to controller 309.

Controller 309 is generally configured to control the position (i.e., set point) of the valve within ACV 305 such that P3 at least substantially equals the target outlet fluid pressure T of system 300. In that regard controller may be configured to determine P3 based at least in part on the first sensor signal provided by sensor 307, and compare P3 to the desired target outlet fluid pressure T. When controller 309 determines that P3 does not at least substantially equal T, it may issue a control signal to an actuator of ACV 305. The control signal may be configured to cause the actuator to adjust a position of the valve within ACV 305, e.g., such that P3 at least substantially equals T. For example, if P3 is lower than T, controller 309 may send a control signal to an actuator of ACV 305, wherein the control signal causes the actuator to move the valve within ACV 305 to a more open position in order to increase the pressure P3 until it substantially equals T. Alternatively if P3 is higher than T, controller 309 may send a control signal to the actuator of ACV 305 that causes the actuator to move the valve within ACV 305 to a more closed position in order to decrease the pressure P3 until it substantially equals T.

In embodiments controller 309 is configured to continuously or periodically monitor sensor signals from sensor 307 and determine whether P3 at least substantially equals T. When P3 does not substantially equal T, controller 309 may issue control signals to the actuator of ACV 305 to adjust the position of the valve within ACV 305 accordingly. In that way, controller 309 may actively monitor the pressure P3 and compensate for pressure fluctuations within system 300 and/or from the fluid supply, such that P3 at least substantially equals T.

In still further non-limiting embodiments controller 309 is configured to determine a pressure drop D across valve system 303, and cause the actuator of ACV 305 to adjust the position of the valve within ACV 305 based at least in part on the determined pressure drop. To determine pressure drop D, controller 309 may cause the actuator of ACV 305 to move the valve within the actuator of ACV 305 to a set position at which a fluid pressure P2 between the ACV 305 and valve system 303 is at least substantially equal to T. Controller 309 may accomplish that by sending a calibration control signal to the actuator of ACV 305 that causes the actuator to move the valve within ACV 305 to a calibrated position at which P2 at least substantially equals T. The calibration signal may be configured based at least in part on calibration data stored in controller 309, wherein the calibration data correlates the position of the valve within ACV 305 to pressure P2.

Once the valve in ACV 305 is in the calibrated position the controller may determine P3 based at least in part on a first sensor signal from sensor 307 as discussed above. Because the valve in ACV 305 is in the calibrated position (i.e., a position at which P2 at least substantially equals T), controller 309 may determine the pressure drop D by subtracting P3 from T, or by subtracting P3 from P2. That is, D=T-P3, or D=P2-P3. In either case, controller 309 may use the determined pressure drop D and the pressure P3 to cause the actuator of ACV 305 to set the position of the valve in ACV. For example, when P3 does not substantially equal T, controller 309 may issue a control signal to the actuator of ACV 305, wherein the control signal is configured to cause the actuator to move the valve of ACV 305 to a position at which the fluid pressure P2 between ACV 305 and valve system 303 is at least substantially equal to T+D. In that way, controller 309 may compensate for the pressure drop D across valve system 303 by setting the position of the valve in ACV 305 to produce a P2 that is greater than T by an amount that equal or substantially equal to D. I.e., the controller 309 issues a control signal that causes an actuator of ACV 305 to move the valve within ACV 305 to a position at which P2 is at least substantially equal to T+D.

While FIG. 3A depicts system 300 as including a single pressure sensor, more than one pressure sensor can be used. For example, system 300 may optionally include a second pressure sensor that is configured to measure a pressure P1 corresponding to an inlet fluid pressure to ACV 305. Alternatively or additionally, system 300 may optionally include a third pressure sensor that is configured to measure fluid pressure P2, i.e. a pressure corresponding to the fluid pressure between ACV 305 and valve system 303. And still further, system 300 may include a fourth pressure sensor that is configured to measure a fluid pressure P4 within valve system 303. For example, when valve system 303 includes first and second check valve assemblies, the fourth pressure sensor may be configured to measure a pressure P4 within the first check valve assembly, and the first pressure sensor 307 may be configured to measure P3 within or downstream of the second check valve assembly. The use of multiple pressure sensors is described further below in connection with FIG. 4.

Figure 4:
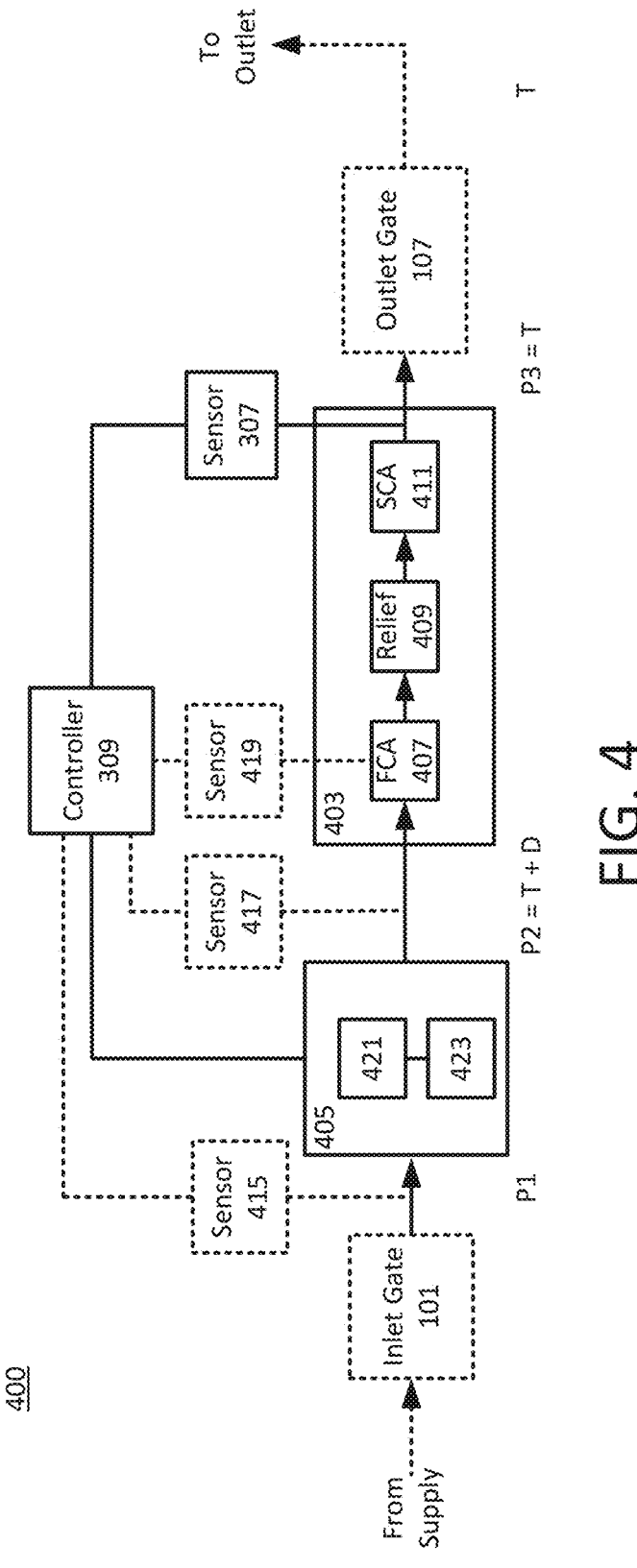
FIG. 4 is a schematic drawing of another example of a pressure compensated fluid supply system including a backflow preventer downstream of an ACV, consistent with the present disclosure.

FIG. 4 is a block diagram of another example of a pressure compensated fluid supply system consistent with the present disclosure. System 400 includes valve system 403 that has an inlet that is fluidly coupled to an outlet of ACV 405 and an outlet that is fluidly coupled to one or more outlets of a destination (e.g., a building). The inlet of ACV 405 is fluidly coupled to a fluid supply, e.g., a municipal water supply. In this embodiment valve system 403 is in the form of a backflow preventer that includes a first check valve assembly (FCA) 407, a relief valve 409, and a second check valve assembly (SCA) 411. It should be understood that such a configuration is not required and any suitable backflow preventer may be used as valve system 403. For example, valve system 304 may be in the form of or include a backflow preventer that includes a single check valve assembly.

ACV 405 includes an actuator 421 and a valve 423. Consistent with the discussion of FIG. 3A, actuator 421 is generally configured to control a position of valve 423, e.g., in response to a control signal from controller 309. Thus, like the actuator described in association with system 300, actuator 421 may be configured to incrementally position valve 423 between a fully open and a fully closed position in response to one or more control signals. Without limitation, actuator 421 is preferably in the form of a proportional solenoid, however it should be understood that any suitable actuator/pilot for valve 423 may be used, such as the examples noted above for ACV 305.

System 400 further includes a first pressure sensor 307 and a controller 309, the nature and function of which is the same as described above with regard to system 300. Like system 300, sensor 307 is configured to communicatively couple with controller 309, and to measure a pressure P3 corresponding to the outlet fluid pressure of valve system 403. In the embodiment of FIG. 4, first pressure sensor 307 is configured to detect P3 at a point downstream of SCA 411, but such a configuration is not required and first pressure sensor 307 may be configured to detect P3 in another location. For example, first pressure sensor 307 may be configured to detect P3 at a point within SCA 411, downstream of SCA 411 but within valve system 403, and/or at a point downstream of valve system 403. In any case, first pressure sensor 307 is configured to detect P3 and generate a first sensor signal indicative of P3 in the same manner as described above with regard to system 300. The first sensor signal may be conveyed to controller 309 in any suitable manner, such as via wired or wireless communication.

As in system 300, controller 309 in system 400 is configured to determine P3 based at least in part on the first control signal, and determine whether P3 differs from a target outlet pressure T for the system based at least in part on a comparison of P3 to T. When P3 does not at least substantially equal T, controller 309 may issue a control signal to actuator 421 of ACV 405, wherein the control signal causes actuator 421 to reposition valve 423. As the manner in which this occurs is the same as described above in connection with FIG. 3A, for the sake of brevity such details are not reiterated.

In the embodiment of FIG. 4 actuator 421 is shown as integral with ACV 405. While such a configuration is useful it is not required, and ACV 405 and actuator 421 may be configured differently. For example, actuator 421 may be separate from ACV 405, but configured to move valve 423 within ACV 405 in response to a control signal as explained above. A plurality of actuators 421 may also be used, e.g., to move one or a plurality of valves 423.

As noted above controller 309 may issue a control signal to actuator 421 in response to a determination that P3 does not substantially equal T. Like system 300, Controller 309 may configure the control signal such that actuator 421 moves valve 423 in order to increase/decrease P3 until P3 at least substantially equals T. In that regard, controller 309 may monitor P3 to determine whether it substantially equals T following the issuance of a (first) control signal. If not, controller 309 may issue another (i.e., a second) control signal to actuator 421, so as to cause actuator 421 to further adjust the position of valve 423 with a corresponding impact on P3. In that way, controller 309 may continuously or periodically adjust the position of valve 423 such that P3 remains at least substantially equal to T, even when operational characteristics of system 400 change, e.g., due to inlet pressure (P1) fluctuations, the development of a leak, etc.

System 400 may further include one or more of a second pressure sensor 415, a third pressure sensor 417, and/or a fourth pressure 419. When used, second pressure sensor 415 is configured to detect a pressure P1 that corresponds to an inlet fluid pressure to ACV 405. In such embodiments controller 309 may be configured to communicatively couple to the second pressure sensor 415 and to determine P1 based at least in part on the second sensor signal. When P3 differs from T, controller 309 may be configured to produce the control signal based at least in part on the first sensor signal and the second sensor signal. For example, controller 309 may include calibration data that correlates the pressure P1 to the outlet pressure downstream of ACV 405 based on the position of valve 423 based on the inlet pressure P1. With that in mind, controller may use P1 and the calibration data to cause actuator 421 to set the position of valve 423 based on the pressure P1 in order to adjust the pressure P3 such that it at least substantially equals T.

When used, third pressure sensor 417 is configured to communicatively couple with controller 309 and measure fluid pressure P2, i.e. a pressure corresponding to the fluid pressure between ACV 305 and valve system 303. In such instances third pressure sensor 417 may provide a third sensor signal indicative of P2 to controller 309. Controller 309 may determine P2 based at least in part on the third sensor signal. Controller 309 may then use P2 to determine the impact of adjustments made to the position of valve 423, e.g., in response to a control signal.

As with system 300, in some embodiments controller 309 in system 400 may be configured to determine a pressure drop D across valve system 403. In embodiments controller 309 determines the pressure drop D across valve system 403 in the same manner described above in connection with FIG. 3A. That is, controller 309 may cause actuator 421 to move valve 423 to a calibrated position, i.e., a position at which the pressure P2 between ACV 405 and valve system 403 is known for a given inlet pressure P1. Controller 309 may then determine D by subtracting P3 (as determined from the first sensor signal provided by first pressure sensor 307) from the known P2. Alternatively when system 400 includes third pressure sensor 417, controller 309 may determine the pressure drop D using the first and third sensor signals provided by first pressure sensor 307 and third pressure sensor 417. For example, controller 309 may determine p2 based at least in part on the third sensor signal provided by third pressure sensor 417, and it may determine P3 from the first sensor signal provided by first pressure sensor 307. Controller 309 may then subtract P3 from P2 to determine the pressure drop D.

Once controller 309 determines the pressure drop D across valve system 403, it may use pressure drop D and P3 to control the position of valve 423 such that P3 at least substantially equals T. For example, when controller 309 determines that P3 does not at least substantially equal T, it may issue a control signal to actuator 421, wherein the control signal is configured to move valve 423 to a position such that a pressure P2 between ACV 405 and valve system 403 is at least substantially equal to T+D. Controller 309 may configure the control signal to do that in any suitable manner, e.g., based on calibration data for ACV 405 that may be stored within a memory of controller 309. Alternatively in embodiments system 400 may include a (third) sensor 417 that is configured to detect pressure P2 and provide a (third) sensors signal indicative of P2 to controller 309. Controller 309 may determine P2 based at least in part from the (third) sensor signal, and use the determined P2 and the pressure drop D to configure the control signal sent to actuator 421 accordingly.

When used, fourth pressure sensor 419 is configured to communicatively coupled to controller 309, and to measure a gauge pressure within first check assembly 407, and provide a fourth sensor signal indicative of that pressure to controller 309. Controller 309 may determine the pressure within FCA 407 based at least in part on the fourth sensor signal. Controller 309 may use the determined pressure within FCA 407 for various purposes, e.g., to understand the impact of adjustments made to the position of valve 423 by actuator 421 in response a control signal, to monitor the condition of backflow preventer 403, etc. Controller 309 may also use the determined pressure within FCA 407 to identify whether FCA 407 is functioning properly, and/or to determine whether there is a leak or other source of pressure loss between ACV 405 and valve system 403.

Figure 5:
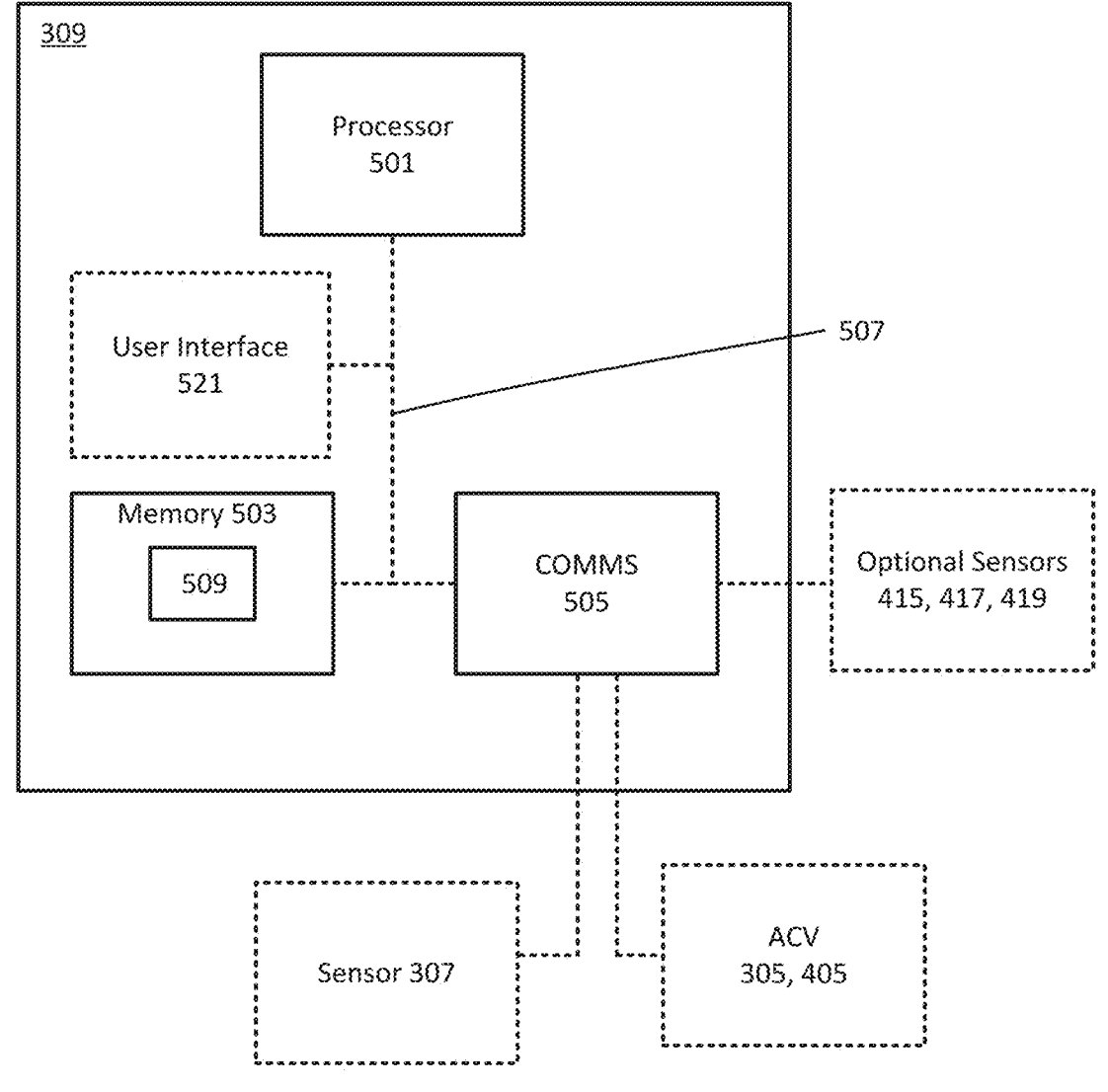
FIG. 5 is a block diagram of one example of a controller consistent with the present disclosure.

FIG. 5. is a block diagram of one example of a controller that may be used in accordance with the present disclosure. Controller 309 includes a processor 501, memory 503, and communications circuitry (COMMS) 505, which are communicatively coupled to one another via a bus 507. Controller 309 may optionally further include a user interface 521. When present, user interface 521 may be configured to permit a user to interact with controller 309, e.g., to set a desired target outlet pressure T.

Processor 501 may be any suitable general-purpose processor or application specific integrated circuit. Without limitation, in embodiments processor 501 is one or more single or multicore processors produced by INTEL® corporation, APPLE® corporation, AMD® corporation, SAMSUNG® corporation, NVIDIA® corporation, Advanced Risc Machines (ARM®) corporation, combinations thereof, or the like. While FIG. 5 depicts the use of a single processor 501, it should be understood that multiple processors can be used.

Memory 503 may be any suitable type of computer readable memory. Examples of memory types that may be used as memory 503 include but are not limited to: programmable memory, non-volatile memory, read only memory, electrically programmable memory, random access memory, flash memory (which may include, for example NAND or NOR type memory structures), magnetic disk memory, optical disk memory, phase change memory, memristor memory technology, spin torque transfer memory, combinations thereof, and the like. Additionally or alternatively, memory 503 may include other and/or later-developed types of computer-readable memory.

COMMS 505 may include hardware (i.e., circuitry), software, or a combination of hardware and software that is configured to allow system controller 309 to transmit and receive messages via wired and/or wireless communication to/from one or more external devices such as but not limited to sensors 307, 415, 417, 419 and ACV 305, 405, as discussed above. Communication between COMMS 505 and such devices may occur, for example, over a wired or wireless connection using one or more currently known or future developed communication standards. COMMS 505 may include hardware to support such communication, e.g., one or more transponders, antennas, BLUETOOTH™ chips, personal area network chips, near field communication chips, wired and/or wireless network interface circuitry, combinations thereof, and the like. In embodiments COMMS 505 is communicatively coupled with at least first pressure sensor 307 and at least an actuator of ACV 305, 405, as discussed previously. In such a state, controller 309 is configured to receive first sensor signals from first pressure sensor 307, and to transmit one or more control signals to an actuator of a valve within ACV 305, 405 as discussed above.

Controller 309 further includes a control module 509. In this specific context, the term "module" refers to software, firmware, circuitry, and/or combinations thereof that is/are configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in controller 309, e.g., within memory 503 or other storage. In embodiments, control module 509 is in the form of logic that is implemented at least in part in hardware to perform operations consistent with the present disclosure.

For example, control module 509 may be configured to cause controller 309 to determine a pressure P3 from a first control signal received from a first pressure sensor, and to determine whether P3 at least substantially equals T as discussed above. When P3 does not at least substantially equal T, control module 509 may cause controller 309 to issue one or more control signals to an actuator of ACV 305, 405, wherein the control signal causes the actuator to move reposition a valve within ACV 305, 405 so as to adjust P3 until it at least substantially equals T as discussed above. Control module 509 may also be configured to receive second, third, and fourth control signals from optional second, third, and fourth pressure sensors as discussed above. In such instances control module 509 may cause controller 309 to determine a pressure P1 or P2 based at least in part on the second and third sensor signals, respectively. Control module 509 may also cause controller to determine a pressure in a first check assembly of a double check backflow preventer, as discussed above. Control module 509 may further cause controller to use the determined pressures (i.e., P1, P2, etc.) for the reasons noted above in connection with FIGS. 3A and 4. For example, Control module 509 may use such data to determine pressure drop D across a valve assembly, to determine an inlet pressure to an ACV, to determine a pressure P2 between the ACV and the valve assembly, etc.

Figure 6:
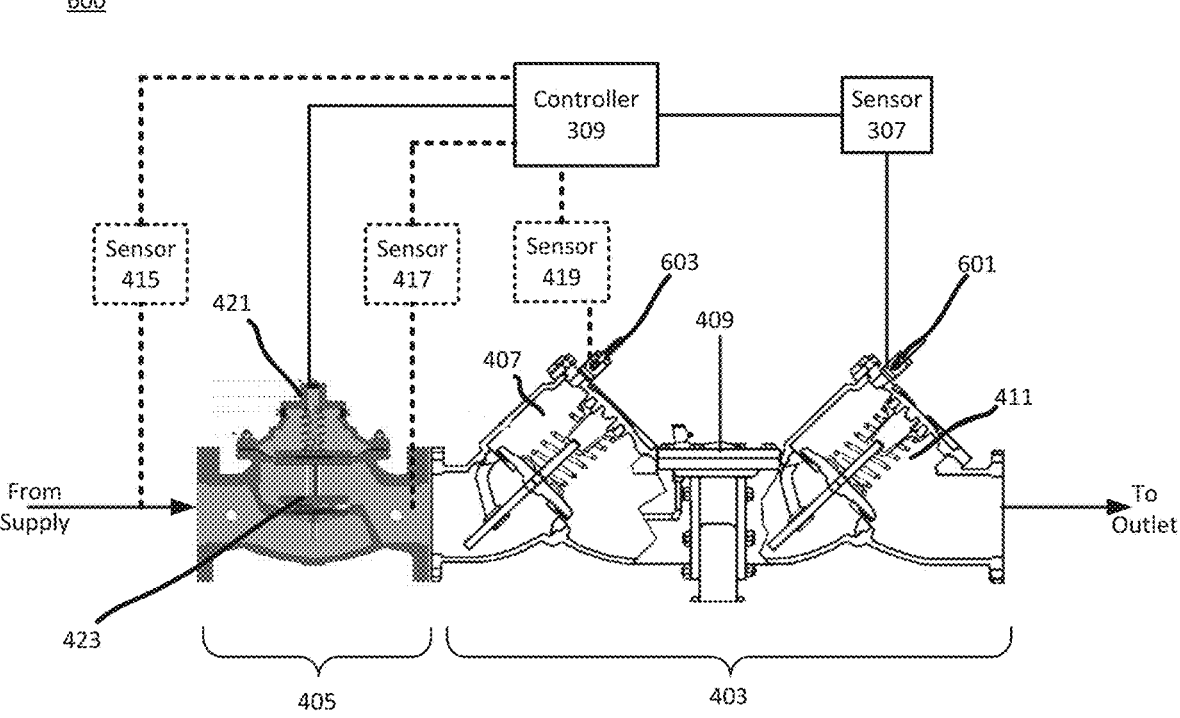
FIG. 6 illustrates a specific non-limiting example of a pressure compensated fluid supply system consistent with the present disclosure.

FIG. 6 depicts another example of a pressure compensated liquid supply system consistent with the present disclosure. Apart from the specific configuration shown in FIG. 6, the nature and function of system 600 is the same as described above in connection with FIGS. 3A and 4 and so will not be reiterated in detail. With that in mind, in system 600 valve system 403 is in the form of a double check backflow preventer that include a spring loaded first check assembly (FCA) 407 and a spring loaded second check assembly (SCA) 411. SCA 411 includes a first test cock 601 and FCA 407 includes a second test cock 603. In this embodiment, the first pressure sensor 307 is coupled to or otherwise configured to measure P3 at the first test cock 601, but such a configuration is not required and P3 may be detected by the first pressure sensor at another location (e.g., downstream of SCA 411).

As further shown in FIG. 6, ACV 405 is in the form of an electronically actuatable valve that includes an actuator 421 and a repositionable valve 423. In this case, actuator 421 is a proportional solenoid valve that can move the valve seat of valve 423, such that valve 423 incrementally moves between a fully closed and a fully open position. The degree to which actuator 421 moves the seat of valve 423 depends on control signals received by actuator 421 from controller 309.

System 600 optionally further includes second, third, and/or fourth pressure sensors 415, 417, 419, the nature, function and use of which is the same as described in connection with FIG. 4. For the sake of illustration optional second pressure sensor 415 is illustrated as measuring P1 upstream of ACV 405, optional third pressure sensor 417 is illustrated as measuring P2 within an outlet of ACV 405, and optional fourth pressure sensor 419 is shown as measuring a pressure within FCA 407 via second test cock 603. Such a configuration is for the sake of example only, and P1, P2, and the pressure within FCA 407 may be detected by optional second, third, and fourth pressure sensors 415, 417, and 419 in another manner.

Figure 7:
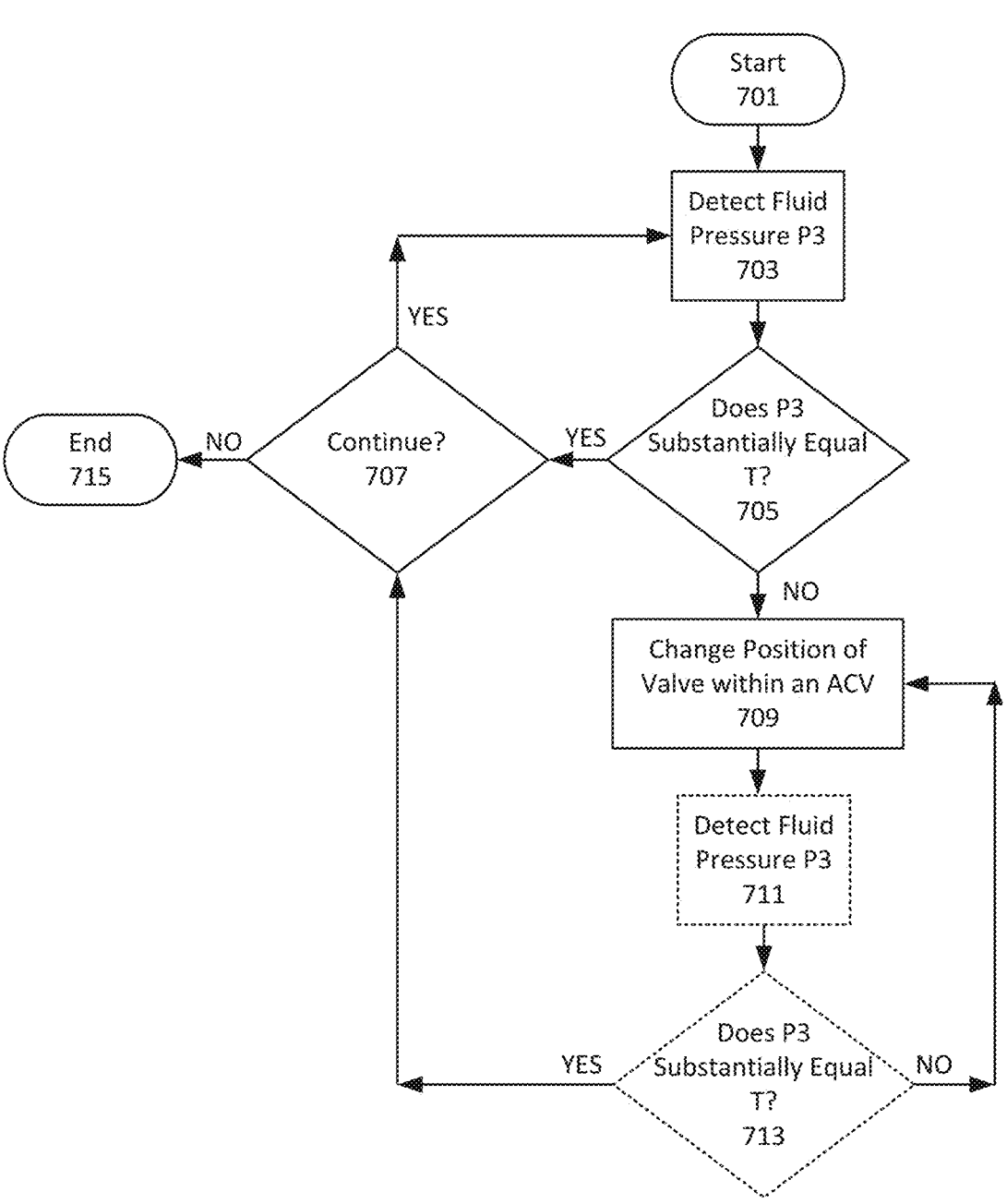
FIG. 7 is a flow diagram of one example of a method of pressure compensation for a fluid supply, consistent with the present disclosure.

Reference is now made to FIG. 7, which is a flow diagram of one example of a pressure compensation method for a fluid supply system consistent with the present disclosure. The method 700 is particularly suitable for use with fluid supply systems in which a valve assembly such as a back-flow preventer is fluidly coupled downstream of an automatic control valve, such as systems 300, 400 described above.

As shown, method 700 begins with start block 701. The method may then proceed to block 703, pursuant to which a fluid pressure P3 corresponding to an outlet fluid pressure of a valve system coupled downstream of an ACV may be detected, e.g., with a first pressure sensor. The method may then proceed to block 705, pursuant to which a decision may be made as to whether P3 is at least substantially equal to a target outlet fluid pressure T of the liquid supply system. The operations of block 705 may be performed by a controller in response to receipt of a first sensor signal indicative of P3 from a first pressure sensor, as previously described.

When the outcome of block 705 is yes, the method may proceed to block 707 pursuant to which a decision may be made as to whether the method is to continue. If so the method loops back to block 703, but if not the method proceeds to block 715 and ends.

When the outcome of block 705 is no, the method proceeds to block 709, pursuant to which a position of a valve within the ACV that is fluidly coupled upstream of the valve system is changed. The operations of block 709 may be performed in the manner described above in connection with FIGS. 3A and 4. For example, a controller may send one or more control signals to an actuator for a valve within an ACV, wherein the actuator causes the valve in the ACV to move in order to increase or decrease P3 as discussed previously. Following the operations of block 709 the method may proceed to optional block 711, pursuant to the fluid pressure P3 may be detected following adjustment of the position of the valve within the ACV. Detection of P3 at this point may be performed in the same manner as discussed above regarding block 703. The method may then proceed to optional block 713, pursuant to which a determination may be made (e.g., by the controller) whether P3 at least substantially equals T. The operations of block 713 may be performed in the same manner as the operations of block 705. If the outcome of block 713 is no the method may loop back to block 709. If the outcome of block 713 is yes (or if blocks 711 and/or 713 are omitted) the method may proceed to block 707, pursuant to which a decision may be made as to whether the method is to continue. If so the method may loop back to block 703, but if not the method may continue to block 715 and end.

As used herein, the term "target outlet pressure" refers to a desired gauge pressure of a fluid to be provided to one or more outlets downstream of fluid supply system.

As used herein the phrase "at least substantially" when used in connection with a value or ranges, means +/−10% (e.g., +/−5%) of the indicated value or the endpoints of the indicated range.

"Circuitry", as used in any embodiment herein, may comprise, for example, singly or in any combination, hardwired circuitry, programmable circuitry such as computer processors comprising one or more individual instruction processing cores, data machine circuitry, software and/or firmware that stores instructions executed by programmable circuitry.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A pressure compensation system for a water supply system, comprising:
   a first pressure sensor, the first pressure sensor configured to detect a fluid pressure P3 corresponding to an outlet fluid pressure of a valve system coupled downstream of an automatic control valve (ACV), the first pressure sensor further configured to produce a first sensor signal indicative of P3;
   a controller configured to communicatively couple to the first pressure sensor; and
   an actuator for the ACV, the actuator configured to communicatively couple to the controller and to control a position of a valve within the ACV;
   wherein:
   the controller is configured to determine P3 based at least in part on the first sensor signal and to compare P3 to a target outlet fluid pressure T of said water supply system; and
   when P3 differs from T, the controller is configured to produce and send a control signal to the actuator, the control signal configured to cause the actuator to change position of the valve within the ACV such that P3 at least substantially equals T.

2. The pressure compensation system of claim 1, wherein the valve system is a backflow preventer.

3. The pressure compensation system of claim 2, wherein said backflow preventer comprises a first check valve assembly and a second check valve assembly, and the first pressure sensor is configured to detect said fluid pressure P3 within or downstream of the second check valve assembly.

4. The pressure compensation system of claim 2, further comprising a second pressure sensor, wherein:
   the second pressure sensor is configured to detect an inlet fluid pressure P1 corresponding to a fluid pressure provided to an inlet of the ACV, and to produce a second sensor signal indicative of P1;
   the controller is configured to communicatively couple to the second pressure sensor, and
   to determine P1 based at least in part on the second sensor signal; and
   when P3 differs from T, the controller is configured to produce the control signal based at least in part on the first sensor signal and the second sensor signal.

5. The pressure compensation system of claim 2, further comprising a second pressure sensor, wherein:
   the second pressure sensor is configured to detect an inlet fluid pressure P1 corresponding to a fluid pressure provided to an inlet of the ACV, and to produce a second sensor signal indicative of P1;
   the controller is configured to communicatively couple to the second pressure sensor, and
   to determine P1 based at least in part on the second sensor signal; and
   when P3 differs from T, the controller is configured to produce the control signal based at least in part on the first sensor signal and the second sensor signal.

6. The pressure compensation system of claim 5, wherein:
   the controller is configured to determine a pressure drop D across the backflow preventer based at least in part on the comparison of P3 and T; and
   when P3 differs from T, the control signal is configured to cause the actuator to change the position of the valve within the ACV such that a fluid pressure P2 between the ACV and the valve system at least substantially equals P3+D.

7. The pressure compensation system of claim 6, further comprising a third pressure sensor configured to detect P2, wherein:
   the third pressure sensor is configured to produce a third sensor signal indicative of P2;
   and the controller is configured to confirm that P2 at least substantially equals P3+D based at least in part on the third sensor signal.

8. The pressure compensation system of claim 1, wherein:
   the controller is configured to determine a pressure drop D across the valve system based at least in part on the comparison of P3 and T; and
   when P3 differs from T, the control signal is configured to cause the actuator to change the position of the valve within the ACV such that a fluid pressure P2 between the ACV and the valve system at least substantially equals P3+D.

9. The pressure compensation system of claim 8, further comprising a third pressure sensor configured to detect P2, wherein:
   the third pressure sensor is configured to produce a third sensor signal indicative of P2;
   and the controller is configured to determine whether P2 at least substantially equals P3+D based at least in part on the third sensor signal.

10. The pressure compensation system of claim 1, further comprising an inlet gate valve upstream of the ACV.

11. A pressure compensated water supply system comprising:

an automatic control valve (ACV) comprising an inlet and an outlet, the inlet fluidly coupled to a water supply;

a valve system comprising an inlet fluidly coupled to the outlet of the ACV and an outlet fluidly coupled to at least one outlet in a destination;

a first pressure sensor configured to detect a fluid pressure (P3) corresponding to an outlet fluid pressure the valve system, the first pressure sensor further configured to produce a first sensor signal indicative of P3;

a controller configured to communicatively couple to the first pressure sensor; and an actuator for the ACV, the actuator configured to communicatively couple to the controller and to control a position of a valve within the ACV;

wherein:

the controller is configured to determine P3 based at least in part on the first sensor signal and to compare P3 to a target outlet pressure T of said water supply system; and when P3 differs from T, the controller is configured to produce and send a control signal to the actuator, the control signal configured to cause the actuator to change a position of the valve within the ACV such that P3 at least substantially equals T.

12. The pressure compensated water supply system of claim 11, wherein the valve system is a backflow preventer.

13. The pressure compensated water supply system of claim 12, wherein:

the backflow preventer comprises a first check valve assembly and a second check valve assembly; and the first pressure sensor is configured to detect said fluid pressure P3 within or downstream of the second check valve assembly.

14. The pressure compensated water supply system of claim 13, further comprising a second pressure sensor, wherein:

the second pressure sensor is configured to detect an inlet pressure P1 corresponding to a fluid pressure provided to the inlet of the ACV, and to produce a second sensor signal indicative of P1;

the controller is configured to communicatively couple to the second pressure sensor, and to determine P1 based at least in part on the second sensor signal; and when P3 differs from T, the controller is configured to produce the control signal based at least in part on the first sensor signal and the second sensor signal.

15. The pressure compensated water supply system of claim 12, wherein:

the controller is configured to determine a pressure drop D across the backflow preventer based at least in part on the comparison of P3 and T; and when P3 differs from T, the control signal is configured to cause the actuator to change the position of the valve within the ACV such that a fluid pressure P2 between the ACV and the valve system at least substantially equals P3+D.

16. The pressure compensated water supply system of claim 15, further comprising a third pressure sensor configured to detect P2, wherein:

the third pressure sensor is configured to produce a third sensor signal indicative of P2; and the controller is configured to confirm that P2 at least substantially equals P3+D based at least in part on the third sensor signal.

17. The pressure compensated water supply system of claim 11, wherein:

the controller is configured to determine a pressure drop D across the valve system based at least in part on the comparison of P3 and T; and when P3 differs from T, the control signal is configured to cause the actuator to change the position of the valve within the ACV such that a fluid pressure P2 between the ACV and the valve system at least substantially equals P3+D.

18. The pressure compensated water supply system of claim 17, further comprising a third pressure sensor, wherein:

the third pressure sensor is configured to detect P2 and to produce a third sensor signal indicative of P2; and the controller is configured to confirm that P2 at least substantially equals P3+D based at least in part on the third sensor signal.

19. The pressure compensated water supply system of claim 11, further comprising a second pressure sensor, wherein:

the second pressure sensor is configured to detect an inlet fluid pressure P1 corresponding to a fluid pressure provided to an inlet of the ACV, and to produce a second sensor signal indicative of P1;

the controller is configured to communicatively couple to the second pressure sensor, and to determine P1 based at least in part on the second sensor signal; and when P3 differs from T, the controller is configured to produce the control signal based at least in part on the first sensor signal and the second sensor signal.

20. The pressure compensated water supply system of claim 11, further comprising an inlet gate valve upstream of the ACV.

21. A method of pressure compensation for a water supply system comprising an automatic control valve (ACV) comprising an inlet fluidly coupled to a water supply and an outlet fluidly coupled to a valve system, the method comprising:

with a first pressure sensor, detecting a fluid pressure P3 corresponding to an outlet fluid pressure of the valve system and producing a first sensor signal indicative of P3; and with a controller communicatively coupled to the first pressure sensor and communicatively coupled to an actuator for a valve within the ACV;

determining P3 based at least in part on the first sensor signal;

comparing P3 to a target outlet fluid pressure T of said water supply system; and when P3 differs from T, producing and sending a control signal to said actuator, the control signal configured to cause the actuator to change a position of the valve within the ACV such that P3 at least substantially equals T.

22. The method of claim 21, wherein the valve system is a backflow preventer.

23. The method of claim 22, wherein said backflow preventer comprises a first check valve assembly and a second check valve assembly, and detecting P3 with said first pressure sensor comprises detecting P3 within or downstream of the second check valve assembly.

24. The method of claim 22, further comprising:

with a second pressure sensor communicatively coupled to the controller, detecting an inlet fluid pressure P1 corresponding to a fluid pressure provided to an inlet of the ACV, and generating a second sensor signal indicative of P1; and with the controller:

determining P1 based at least in part on the second sensor signal; and when P3 differs from T, the controller produces said control signal based at least in part on the first sensor signal and the second sensor signal.

25. The method of claim 22, further comprising, with the controller:

determining a pressure drop D across the backflow preventer based at least in part on the comparison of P3 and T; and when P3 differs from T, the control signal is configured to cause the actuator to change the position of the valve within the ACV such that a fluid pressure P2 between the ACV and the valve system at least substantially equals P3+D.

26. The method of claim 25, further comprising:

with a third pressure sensor communicatively coupled to the controller, detecting P2 and producing a third sensor signal indicative of P2; and with the controller, determining whether P2 at least substantially equals P3+D based at least in part on the third sensor signal.

27. The method of claim 21, further comprising, with said controller:

determining a pressure drop D across the valve system based at least in part on the comparison of P3 and T; and when P3 differs from T, configuring the control signal to cause the actuator to change the position of the valve within the ACV such that a fluid pressure P2 between the ACV and the valve system at least substantially equals P3+D.

28. The method of claim 27, further comprising:

with a third pressure sensor communicatively coupled to the controller, detecting P2 and producing a third sensor signal indicative of P2; and with the controller, determining whether P2 at least substantially equals P3+D based at least in part on the third sensor signal.

29. The method of claim 27, further comprising:

with a second pressure sensor communicatively coupled to the controller, determining an inlet fluid pressure P1 corresponding to a fluid pressure provided to an inlet of the ACV and producing a second sensor signal indicative of P1; and with the controller:

determining P1 based at least in part on the second sensor signal; and when P3 differs from T, producing the control signal based at least in part on the first sensor signal and the second sensor signal.

30. The method of claim 21, further comprising closing an inlet gate valve located upstream of the ACV.

* * * * *